Patented Jan. 25, 1949

2,460,224

UNITED STATES PATENT OFFICE 2,460,224

BIOTIN INTERMEDIATE

Stanton A. Harris, Westfield, and Karl Folkers,
Plainfield, N. J., assignors to Merck & Co., Inc.,
Rahway, N. J., a corporation of New Jersey No Drawing. Application September 16, 1944,
Serial No. 554,453

18 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

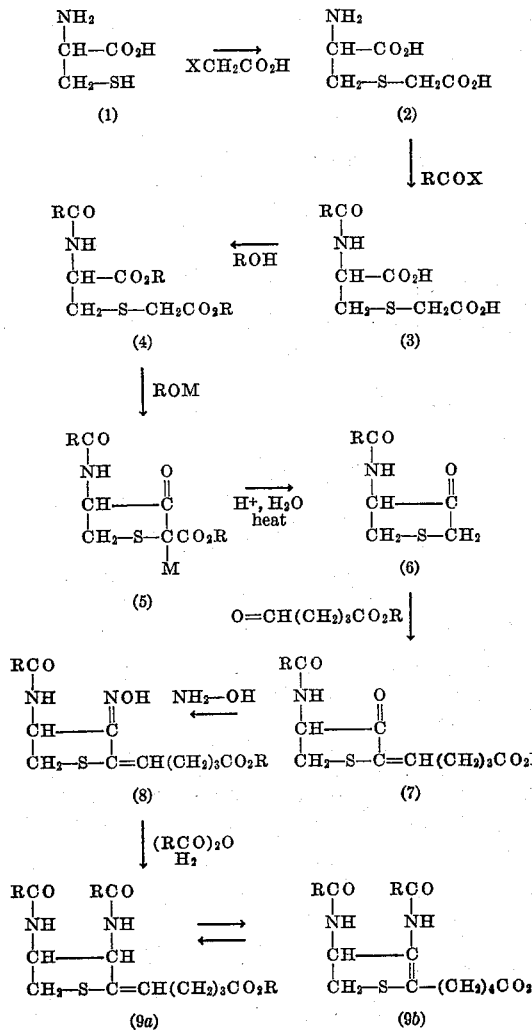

It is now found that this compound can be synthesized by reactions indicated as follows:

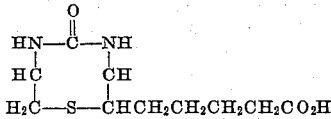

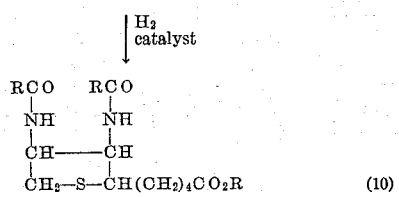

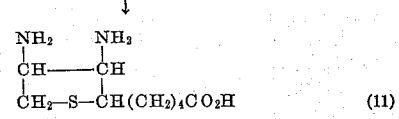

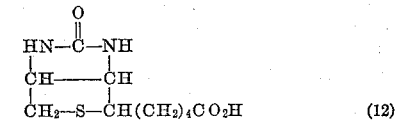

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethyl-mercapto-propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst to produce the diester (4) of the acid (3), and the diester is treated with alkali metal alcoholate or an alkaline earth metal alcoholate or an alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxybutanal ester in a lower aliphatic alcohol reaction medium containing piperidine and a lower aliphatic carboxylic acid, produces 2-(4'-carboalkoxy-butylidene) - 3-keto-4-acylamido-tetrahydrothiophene (7). This product, when reacted with hydroxylamine yields as ester of the corresponding oxime, 2-(4'-carboxy-butylidene)-3-isonitroso-4 - acylamido - tetrahydrothiophene (8) which upon treatment with a mixture of zinc, a lower aliphatic acid and a lower aliphatic acid anhydride, produces an equilibrium mixture of 2-(4'-carboxy - butylidene)-3:4 - di(acylamido)-tetrahydrothiophene ester (9a) and 2-(4'-carboxy-butyl)-3:4-di(acylamido)-4:5 - dihydrothiophene ester (9b). This equilibrium mixture, or if preferred, one of the equilibrants, is then treated with hydrogen in the presence of a hydrogenation catalyst to yield 2-(4'-carboxy-butyl)-3:4-di(acylamido) - tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido - tetrahydrothiophene. This product is obtained as a mixture of stereoisomers, one of which is racemic biotin, from which upon resolution, is obtained the dextrorotatory isomer, biotin.

This invention is concerned generally with the class of compounds of which intermediate 8 above is a member, namely 2-(omega-carboxy-alkylidene)-3-isonitroso-4-acylamido - tetrahydrothiophenes, and esters thereof represented by the general formula:

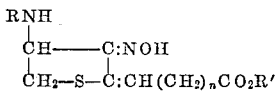

wherein R. is an acyl group, R' is selected from the class consisting of hydrogen alkyl, aryl and arylalkyl groups, and $n$ is a small integer. More specifically, the invention is concerned with compounds of the above formula wherein $n$ is 3, the esters of 2-(4'-carboxy-butylidene)-3-isonitroso-4-acylamido-tetrahydrothiophenes.

According to the present invention, compounds of the above general formula are prepared by reacting hydroxylamine or a hydroxylamine salt with an ester of 2-(omega-carboxy-alkylidene)-3-keto-4-acylamido - tetrahydrothiophene. Corresponding acids are obtained by hydrolysis of the esters thus produced. The compound used as starting material is obtained by the process outlined above and described in detail in concurrently filed applications, Serial Nos. 554,458, 554,449, now Patent 2,437,719, 554,450, 554,-451, and 554,452. When hydroxylamine or a salt thereof is reacted with an ester of 2-(4'-carboxy-butylidene)-3-keto-4-acylamido - tetrahydrothiophene, the product obtained is an ester of 2-(4'-carboxy - butylidene)-3 - isonitroso - 4-acylamido-tetrahydrothiophene, an intermediate useful in synthesis of biotin as described in concurrently filed applications, Serial Nos. 554,454, 554,-455, 554,456, and 554,457.

The following examples illustrate methods of carrying out the present invention, but it is to be understood that these examples are given by way of illustration and not of limitation.

*Example 1*

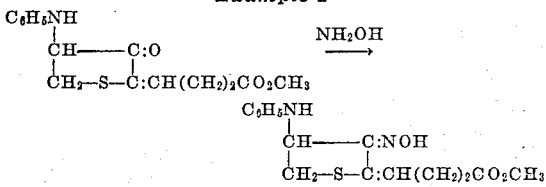

About 2.3 g. of 2-(3'-carbonmethoxy-propylidene)-3-keto-4-benzamido - tetrahydrothiophene are added to a solution of approximately 0.75 g. of hydroxylamine hydrochloride in 15 cc. of pyridine, and, after standing about 16 hours at room temperature, the mixture is diluted with about 4 volumes of water and extracted with chloroform. The chloroform extract is cooled, washed at below 10° C. with hydrochloric acid (1 N), then with water, and dried. Upon evaporation of the chloroform the product, 2-(3'-carbomethoxy - propylidene) - 3-isonitroso - 4 - benzamido-tetrahydrothiophene is obtained as an oil which is purified by recrystallization from methanol and ether to obtain the pure product (M. P. 166–167° C.).

*Example 2*

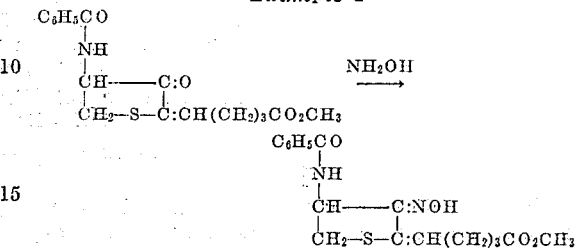

About 13.32 g. of 2-(4'-carbomethoxy-butylidene) 3-keto-4-benzamido-tetrahydrothiophene and about 2.80 g. of hydroxylamine hydrochloride are dissolved in alcohol and mixed with about 50 cc. of dry pyridine. The mixture is allowed to stand about 15 hours at 30° C., then it is diluted with four volumes of water and extracted with chloroform. The chloroform extract is cooled, shaken with hydrochloric acid (2.5 N), washed by shaking with water, dried and concentrated at 40° C. Upon evaporation of the solvent a mass is obtained which is extracted with ether to remove impurities, and dried. The crude 2-(4'-carbomethoxy-butylidene) - 3 -isonitroso-4- benzylamido- tetrahydrothiophene thus obtained (M. P. 129–138° C.) is purified by repeated recrystallization from methanol, yielding the pure oxime (M. P. 159–160° C.). When the pure oxime is treated with alcoholic sodium hydroxide, then with aqueous acid, 2-4'-carboxy-butylidene)-3-isonitroso-4-benzamido - tetrahydrothiophene (M. P. 203–4° C.) is obtained.

*Example 3*

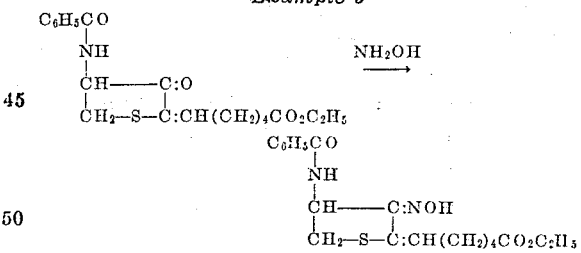

About 10 g. of 2-(5-carboethoxy-pentylidene)-3-keto-4-benzamido-tetrahydrothiophene are added to a solution of approximately 3.9 g. of hydroxylamine hydrochloride in about 50 cc. of pyridine and the solution, after standing about 16 hours at room temperature, is diluted, extracted with chloroform and otherwise processed as described in the preceding examples. The product obtained is 2-(5'-carbothoxy-pentylidene)-3-isonitroso- 4-benzamido- tetrahydrothiophene (M. P. 140–142° C.)

It will be understood by persons versed in this field of invention that the above-described reactions can be conducted using as a starting material a compound within the general class of the 2-(omega-carboxy-alkylidene) - 3-keto-4-acylamido-tetrahydrothiophene esters but having an acylamido group different from benzamido, for example acetamido starting materials yield corresponding acetamido products, propamido starting materials yield propamido products, etc. The ester group, not being involved in or affected by the reaction, can be any alkyl, aryl or arylalkyl ester and a corresponding product is obtained, viz., propyl ester starting material yields propyl ester product, benzyl ester starting material yields benzyl ester product, etc.

Modifications may be made in carrying out the present invention without departing from the spirit and scope thereof and the invention is to be limited only by the appended claims.

What is claimed is:

1. A compound selected from the class consisting of aryl, alkyl and arylalkyl esters of 2-(omega-carboxy-alkylidene) - 3 - isonitroso-4-acylamido-tetrahydrothiophene.

2. Alkyl esters of 2-(3'-carboxy-propylidene)-3-isonitroso-4-acylamido-tetrahydrothiophene.

3. Alkyl esters of 2-(5'-carboxy-pentylidene)-3-isonitroso-4-acylamido-tetrahydrothiophene.

4. Alkyl esters of 2-(4'-carboxy-butylidene)-3-isonitroso-4-acylamido-tetrahydrothiophene.

5. Lower alkyl esters of 2-(4'-carboxy-butylidene)-3-isonitroso-4-acylamido - tetrahydrothiophene.

6. The ethyl ester of 2-(3'-carboxy-propylidene)-3-isonitroso-4-benzamido-tetrahydrothiophene.

7. The methyl ester of 2-(4'-carboxy-butylidene)-3-isonitroso-4-benzamido -tetrahydrothiophene.

8. The ethyl ester of 2-(5'-carboxy-pentylidene)-3-isonitroso-4-benzamido- tetrahydrothiophene.

9. The process that comprises reacting a substance selected from the class consisting of hydroxylamine and salts thereof with a compound selected from the class which consists of alkyl, aryl and arylalkyl esters of 2-(omega-carboxy-alkylidene)-3-keto-4-acylamido - tetrahydrothiophene to produce the corresponding 3-isonitroso compound.

10. The process that comprises reacting a substance selected from the class consisting of hydroxylamine and salts thereof with an alkyl ester of 2-(3'-carboxy-propylidene) - 3 - keto-4-acylamido-tetrahydrothiophene to produce the corresponding 3-isonitroso compound.

11. The process that comprises reacting a substance selected from the class consisting of hydroxylamine and salts thereof with an alkyl ester of 2-(4'-carboxy-butylidene) - 3 - keto-4-acylamido-tetrahydrothiophene to produce the corresponding 3-isonitroso compound.

12. The process that comprises reacting a substance selected from the class consisting of hydroxylamine and salts thereof with an alkyl ester of 2-(5'-carboxy-pentylidene) - 3 - keto-4-acylamido-tetrahydrothiophene to produce the corresponding 3-isonitroso compound.

13. The process that comprises reacting a substance selected from the class consisting of hydroxylamine and salts thereof in a pyridine solvent with 2-(4' - carbomethoxy - butylidene)-3-keto-4-benzamido-tetrahydrothiophene to produce the corresponding 3-isonitroso compound.

14. The stereoisomer of 2-(4'-carbomethoxy-butylidene)-3-isonitroso - 4 - benzamido tetrahydrothiophene having, when in substantially pure form, a melting point of 160° C.

15. Alkyl esters of 2-(4'-carboxy-alkylidene)-3-isonitroso-4-acylamido-tetrahydrothiophene.

16. The process which comprises reacting a substance selected from the class consisting of hydroxylamine and salts thereof with an alkyl ester of 2-(omega-carboxy-alkylidene)-3-keto-4-acylamido-tetrahydrothiophene to produce the corresponding 3-isonitroso compound.

17. The process which comprises reacting a substance selected from the class consisting of hydroxylamine and salts thereof with 2-(3'-carbomethoxy-propylidene)-3-keto - 4 - benzamido-tetrahydrothiophene to produce the corresponding 3-isonitroso compound.

18. The process which comprises reacting a substance selected from the class consisting of hydroxylamine and salts thereof with 2-(5'-carboethoxy-pentylidene)-3-keto-4 - benzamido-tetrahydrothiophene to produce the corresponding 3-isonitroso compound.

STANTON A. HARRIS.
KARL FOLKERS.

REFERENCES CITED

The following references are of record in the file of this patent:

Whitmore: "Organic Chemistry," page 241, Van Nostrand, New York, 1937.

Certificate of Correction

Patent No. 2,460,224.                                                                 January 25, 1949.

STANTON A. HARRIS ET AL.

It is hereby certified that errors appear in the printed specification of the above numbered patent requiring correction as follows:

Column 1, line 13, for that portion of the formula reading "HC    CH" read $HC\text{——}CH$; column 2, line 51, for "yields as", read *yields an*; column 4, line 37, Example 2, for "2-4'" read *2-(4'*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*